United States Patent
Yada et al.

(10) Patent No.: US 12,399,513 B2
(45) Date of Patent: Aug. 26, 2025

(54) VAPORIZATION DEVICE WITH INTEGRAL GAIN SWITICHING PORTION FOR VALVE CONTROLLER

(71) Applicant: HORIBA STEC, Co., Ltd., Kyoto (JP)

(72) Inventors: Hidetaka Yada, Kyoto (JP); Yuichiro Asaumi, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 447 days.

(21) Appl. No.: 18/049,762

(22) Filed: Oct. 26, 2022

(65) Prior Publication Data
US 2023/0137252 A1    May 4, 2023

(30) Foreign Application Priority Data
Nov. 1, 2021   (JP) .................. 2021-178560

(51) Int. Cl.
G05D 7/06    (2006.01)
(52) U.S. Cl.
CPC ......... G05D 7/0635 (2013.01); G05D 7/0623 (2013.01)
(58) Field of Classification Search
CPC .. G05D 7/0635; G05D 7/0623; G01F 1/6847; B05B 7/0483; B05B 7/1209; B05B 7/1686
USPC .................................................. 700/282, 275
See application file for complete search history.

(56) References Cited

U.S. PATENT DOCUMENTS

| 8,544,828 B2* | 10/2013 | Miyamoto | B01B 1/005 261/DIG. 65 |
| 10,240,233 B2* | 3/2019 | Terasaka | B01D 1/0082 |
| 10,391,417 B2* | 8/2019 | Ito | B01D 1/14 |
| 2010/0037688 A1* | 2/2010 | Inoue | G01F 1/6847 702/45 |
| 2010/0049461 A1* | 2/2010 | Lull | G01F 1/6965 702/100 |
| 2011/0106319 A1* | 5/2011 | Takahashi | G05B 11/06 700/282 |

FOREIGN PATENT DOCUMENTS

JP    2001156055 A    6/2001

* cited by examiner

*Primary Examiner* — Chun Cao
(74) *Attorney, Agent, or Firm* — Alleman Hall & Tuttle LLP

(57) ABSTRACT

A vaporization device is provided with a control valve on a flow path along which flows a liquid material, a vaporizing portion in which the liquid material is vaporized by decompression or heating, a liquid flow rate sensor that measures a flow rate of a liquid material flowing along the flow path, and a valve controller that controls the control valve using PI control or PID control that is based on a set value showing a set flow rate and on a measurement value of the flow rate that is measured by the liquid flow rate sensor. The vaporization device is configured to, during a transient response period of the flow rate that is measured by the liquid flow rate sensor, switch the integral gain set in the valve controller from a reference integral gain to a corrected integral gain that is different from the reference integral gain.

15 Claims, 12 Drawing Sheets

VAPORIZATION DEVICE WITH INTEGRAL GAIN SWITCHING PORTION FOR VALVE CONTROLLER

TECHNICAL FIELD

The present invention relates to a vaporization device in which a flow rate of a liquid material is controlled using PI control or PID control.

TECHNICAL BACKGROUND

In, for example, a semiconductor manufacturing process, a vaporization device is used to vaporize a liquid material and thereby obtain a material gas that is to be introduced into a vacuum chamber interior. As is shown in Patent Document 1, this vaporization device is provided with a control valve inside which a liquid material and a carrier gas are mixed together, a vaporizing portion that is provided on a downstream side from the control valve and that vaporizes the liquid material by means of heating or decompression, a liquid flow rate sensor that measures a flow rate of the liquid material on an upstream side from the control valve, and a valve controller that controls an aperture of the control valve using PID control that is based on a set value showing a set flow rate that is set by a user and on a measurement value that is measured by the liquid flow rate sensor.

However, in this type of vaporization device, if stepped flow rate values are set so that, from a state in which, for example, the control valve is fully closed, the liquid material is maintained at a target constant flow rate value then, in some cases, a considerable length of time is required until the measurement value of the flow rate that is measured by the liquid flow rate sensor matches the final set value of the set flow rate. In other words, the offset is not canceled out in a short period of time, and there are cases in which the settling time cannot be contained within the allowed time stipulated, for example, by the demands of the semiconductor manufacturing process. Moreover, this type of problem also arises in cases in which there is a transition from a state in which a predetermined flow rate is being maintained to a state in which a larger flow rate is set.

The applicants of the present specification made exhaustive investigations into why this type of phenomenon occurs. As a result, they made the hitherto unknown discovery that the reason for this was that the temperature of the control valve decreased from the point in time when there was a rise in the flow rate of the liquid material, so that the required aperture could not be achieved due to thermal contraction of the metals forming the valve body and valve seat and the like. In other words, if the liquid material was vaporized in the vaporizing portion adjacent to the control valve, the control valve was cooled by the resulting vaporization heat. Moreover, because of the thermal contraction generated in the component elements forming the control valve, a larger aperture than the aperture that ought to have been implemented was being maintained by the PID control. As a result, the phenomenon of offset continuing to be present is generated.

In addition, due to the material of the control valve and settings of the various heaters and the like, the temperature of the control valve increases and thermal contraction is generated in the metals forming the valve body and valve seat and the like. Because of this the aperture becomes smaller than the required aperture, and overshoot occurs followed by undershoot, so that the actual flow rate is maintained in a smaller state than the set value, and the continuing presence of offset may also occur.

In order to eliminate this type of offset, consideration might be given to setting the integral gain to a larger value than the current value. However, simply raising the value of the integral gain is difficult in this type of vaporization device. In other words, in the vaporization device, because strict limitations are imposed not only on the settling time, but also on the rise time and on the amount of overshoot, a high gain that is already close to the limit is set. If an even higher value is constantly set as the integral gain in the valve controller of a vaporization device on which the above-described tuning has already been performed, then hunting is generated in the flow rate of the liquid material by overshoot and unforeseen turbulence in the transient response period when the flow rate rises, and there is a possibility of the actual flow rate control of the liquid material becoming unstable in the first place.

DOCUMENTS OF THE PRIOR ART

Patent Documents

Patent Document 1

Japanese Unexamined Patent Application (JP-A) No. 2001-156055

DISCLOSURE OF THE INVENTION

Problems to be Solved by the Invention

The present invention was therefore conceived in view of the above-described problems, and it is an object thereof to provide a vaporization device that, while enabling a settling time, in particular, to be made shorter than is conventionally possible, also enables the stability of the control to be maintained. In addition, it is an object of the present invention to provide fluid control that, in the same way, enables both the settling time to be shortened and the stability of the control to be maintained even in a fluid control device in which there is a temperature reduction in the control valve while control is being performed so as to cause the above-described control-related problems to occur.

Means for Solving the Problem

In other words, the vaporization device of the present invention is provided with a control valve that is provided on a flow path along which flows a liquid material, a vaporizing portion in which the liquid material is vaporized by decompression or heating, a liquid flow rate sensor that measures a flow rate of a liquid material flowing along the flow path, and a valve controller that controls the control valve using PI control or PID control that is based on a set value showing a set flow rate and on a measurement value of the flow rate that is measured by the liquid flow rate sensor, and is characterized in being further provided with an integral gain switching portion that, during a transient response period of the flow rate that is measured by the liquid flow rate sensor, switches the integral gain set in the valve controller from a reference integral gain to a corrected integral gain that is different from the reference integral gain.

Moreover, a control method for a vaporization device according to the present invention is a control method for a vaporization device that includes a control valve that is provided on a flow path along which flows a liquid material, a vaporizing portion in which the liquid material is vaporized by decompression or heating, and a liquid flow rate sensor that measures a flow rate of a liquid material flowing along the flow path, and that is characterized in that the control valve is controlled using PI control or PID control that is based on a set value showing a set flow rate and on a measurement value of the flow rate that is measured by the liquid flow rate sensor, and in that, during a transient response period of the flow rate that is measured by the liquid flow rate sensor, the integral gain set in the valve controller is switched from a reference integral gain to a corrected integral gain that is different from the reference integral gain.

If this type of structure is employed, then because an integral gain that is set in the valve controller is switched from the reference integral gain to the corrected integral gain during a flow rate transient response period that is measured by the liquid flow rate sensor, even if the amount of vaporization of the liquid material in the vaporizing portion increases and, as a result of this, the temperature of the control valve decreases, and an increase in the aperture is generated due to thermal contraction so that a state is created in which it is difficult to cancel any offset, it is possible for any adverse effects that might result from this to be negated. Moreover, in the same way, even though the properties of the material used to form the control valve combined with the amount of heating in the vaporizing portion and the like may cause the temperature of the control valve to increase, and may create a state in which an aperture decrease is generated by the resulting thermal expansion so that it becomes difficult for any offset to be cancelled out, by employing the invention described in the present application it becomes possible to negate any adverse effects that might result from this. Accordingly, it is possible to shorten the settling time that is required for the set value and the measurement value to substantially match each other, and this settling time can be contained within an allowed time. Moreover, during an initial stage of the flow rate transient response period when no temperature reduction has yet occurred, the reference integral gain is set, and it is only possible to set the corrected integral gain when the temperature has decreased. Because of this, it is possible to reduce the amount of overshoot, and to shorten the time needed for the offset to be cancelled out, and to additionally achieve even greater control stability.

In order to make it possible to reduce offset that is generated as a result of a temperature reduction in the control valve causing the aperture to be enlarged, it is desirable that the corrected integral gain be set to a value that is higher than a value of the reference integral gain.

In order to make it possible to use an integral gain that is suitable for cases in which, for example, the control valve is operating at the temperature at which it operates in a normal usage state, and to thereby enable the stability of the control to be increased, it is desirable that the reference integral gain be a value that is set in such a way that, in a case in which the vaporizing portion is not present, a settling time of a flow rate response is within an allowed time that has been set in advance.

In order to make it possible to set the corrected integral gain that is suitable for cases in which a temperature reduction has occurred in the control valve based on the reference integral gain, it is desirable that the corrected integral gain be a value that is determined in such a way that, in a case in which the vaporizing portion is present, and the reference integral gain is switched to the corrected integral gain during the transient response period, a settling time of a flow rate response is within the allowed time.

After the offset has been canceled out, in order to make it possible to increase resistance to external turbulence and make it difficult for the measurement value to shift away from the set value, while also enabling the stability of the control to be further increased, it is desirable that the integral gain switching portion restore an integral gain that has been set in the valve controller after the measurement value has been converged at the set value from the corrected integral gain to the reference integral gain.

In order to make it possible to switch from the reference integral gain to the corrected integral gain at a suitable timing that enables any offset to be canceled out in a short space of time by means of a simple algorithm, it is desirable that, taking the starting point of a rise in the set flow rate as a reference, the integral gain switching portion switch the integral gain set in the valve controller from the reference integral gain to the corrected integral gain after a predetermined time has elapsed.

In order to make it possible, for example, to shorten the rise time and the settling time in the flow rate response, and to thereby enable the amount of overshoot to be reduced while also making it possible to prevent the occurrence of hunting and the like in the flow rate, it is desirable that a switching timing of the switch from the reference integral gain to the corrected integral gain be set during a period from the starting point of a rise in the flow rate response in a case in which the control valve is continuously controlled while being fixed to the reference integral gain until a peak point of the rise in the flow rate response. Here, the term 'peak point' refers not only to just the point in time when the flow rate value reaches its maximum value, but may also include those sections that are adjacent thereto when the point in time when the flow rate value reaches its maximum value is taken as a reference point. For example, the adjacent sections correspond to those sections where, even if the flow rate value shifts by a minute predetermined length of time from the point in time when the flow rate value reaches its maximum value, the amount of overshoot is still sufficiently reduced and hunting and the like are prevented.

In order to make it possible to switch from the reference integral gain to a corrected integral gain having a more appropriate value while taking into consideration the effects from the amount of temperature reduction and the speed of temperature reduction in the control valve, it is desirable that the integral gain switching portion be formed in such a way that the switching timing of the switch from the reference integral gain to the corrected integral gain is set in accordance with a size of the set value showing the set flow rate or in accordance with the type of liquid material.

It is also desirable that the vaporization device be additionally provided with a corrected integral gain modifying portion that modifies the corrected integral gain.

By employing this type of structure, because the corrected integral gain modifying portion modifies the corrected integral gain, the integral gain switching portion is able to switch to a corrected integral gain that takes the temperature reduction of the control valve into consideration, and it is possible to shorten the length of time taken until the offset is canceled out.

As an example, the corrected integral gain modifying portion may modify the corrected integral gain based on at least one of the type of liquid material, a set flow rate of the liquid material, a set pressure of the liquid material, a set flow rate of a carrier gas, a pressure on an upstream side from the control valve, a pressure on a downstream side from the control valve, a set temperature of the control valve, a set temperature of the vaporizing portion, and a peripheral temperature.

By employing this type of structure, because the corrected integral gain modifying portion modifies the corrected integral gain based on at least one of the type of liquid material, a set flow rate of the liquid material, a set pressure of the liquid material, a set flow rate of a carrier gas, a pressure on an upstream side from the control valve, a pressure on a downstream side from the control valve, a set temperature of the control valve, a set temperature of the vaporizing portion, and a peripheral temperature, it is possible to modify the corrected integral gain to one that takes into account the effects from the temperature reduction of the control valve.

In order to enable the efficiency of the vaporization of the liquid material in the vaporizing portion to be improved, it is desirable that the control valve be provided with a liquid intake port through which the liquid material is introduced into an interior of the vaporization device, a gas intake port through which the carrier gas is introduced into the interior of the vaporization device, and a discharge port through which a gas-liquid mixture that is formed by mixing together the liquid material and the carrier gas is discharged to an interior of the vaporization device. If this type of aspect is employed, because the amount of temperature reduction and the speed of this temperature reduction in the control valve become even greater, the effect obtained from the present invention of improving the control characteristics that is achieved by switching the integral gain is demonstrated even more conspicuously.

An example of a specific aspect of the present invention that makes it easy for a large temperature decrease to occur in the control valve while control is being performed, and enables a considerable improvement effect in the control characteristics to be anticipated from the switching of the integral gain compared to the conventional technology is a structure in which the control valve and the vaporizing portion are provided adjacent to each other.

In order to make it possible to enjoy substantially the same effects as those provided by the vaporization device according to the present invention by, for example, updating a program in an existing vaporization device, it is possible to use a storage medium for a control program that is used in a vaporization device that includes a control valve that is provided on a flow path along which flows a liquid material, a vaporizing portion in which the liquid material is vaporized by decompression or heating, and a liquid flow rate sensor that measures a flow rate of a liquid material flowing along the flow path, and that is characterized in causing a computer to function as a valve controller that controls the control valve using PI control or PID control that is based on a set value showing a set flow rate and on a measurement value of the flow rate that is measured by the liquid flow rate sensor, and as an integral gain switching portion that, during a transient response period of the flow rate that is measured by the liquid flow rate sensor, switches the integral gain set in the valve controller from a reference integral gain to a corrected integral gain that is different from the reference integral gain. Note that this program for a vaporization device may be distributed electronically, or may be recorded on a program recording medium such as a CD, DVD, or flash memory or the like.

Moreover, if a structure is employed in which a fluid control device is provided with a control valve that is provided on a flow path along which flows a fluid, and a valve controller that controls the control valve using PI control or PID control that employs a set value of a flow rate or pressure indicated by a target command and a measurement value that is measured by the fluid sensor, and in which the fluid control device is characterized in that the control valve is provided in a usage environment in which, during the control performed by the valve controller, a temperature change of a predetermined value or greater is generated subsequent to a rise of a measurement value that is measured by the fluid sensor, and also in that the fluid control device is further provided with an integral gain switching portion that, during a transient response period of the measurement value that is measured by the fluid sensor, switches the integral gain set in the valve controller from a reference integral gain to a corrected integral gain that is different from the reference integral gain, then even in a case in which, for example, a low-temperature fluid is introduced into the control valve that is being kept at a high temperature so that the temperature of the control valve is greatly reduced, it is still possible to achieve both control stability and a reduction in the settling time. Conversely, even in a case in which a high-temperature fluid is introduced into the control valve so that the temperature of the control valve is greatly increased, in the same way, it is still possible to achieve both control stability and a reduction in the settling time.

Effects of the Invention

In this way, according to the vaporization device according to the present invention, because a structure is employed that enables a switch to be made from the reference integral gain to the corrected integral gain during the transient response period of the flow rate, it is possible to solve the problem, that if, for example, PID control is performed on the control valve while this is fixed to the reference integral gain, then the offset is not able to be canceled out due to the temperature reduction of the control valve itself, so that the settling time becomes too prolonged. Moreover, in a case in which a temperature reduction has been generated in the control valve so that it is easy for the aperture to become enlarged, because it is possible to apply the corrected integral gain in this state, it is possible to prevent hunting from occurring too easily as a result of a high gain being set, and to also achieve stable control. In the same way, even in a case in which the flow rate is maintained at a lower value that the set value due to a rise in the temperature of the control valve itself, it is still possible in this case to cancel out the offset and achieve a reduction in the settling time.

BEST EMBODIMENTS FOR IMPLEMENTING THE INVENTION

A vaporization device 100 of a first embodiment of the present invention will now be described with reference to FIG. 1 through FIG. 8.

The vaporization device 100 of the first embodiment is used, for example, in a semiconductor manufacturing process, and is employed to vaporize a liquid material (i.e., a raw material liquid) so as to create a material gas (i.e., a raw material gas) which is then supplied to a chamber interior.

Figure 1:
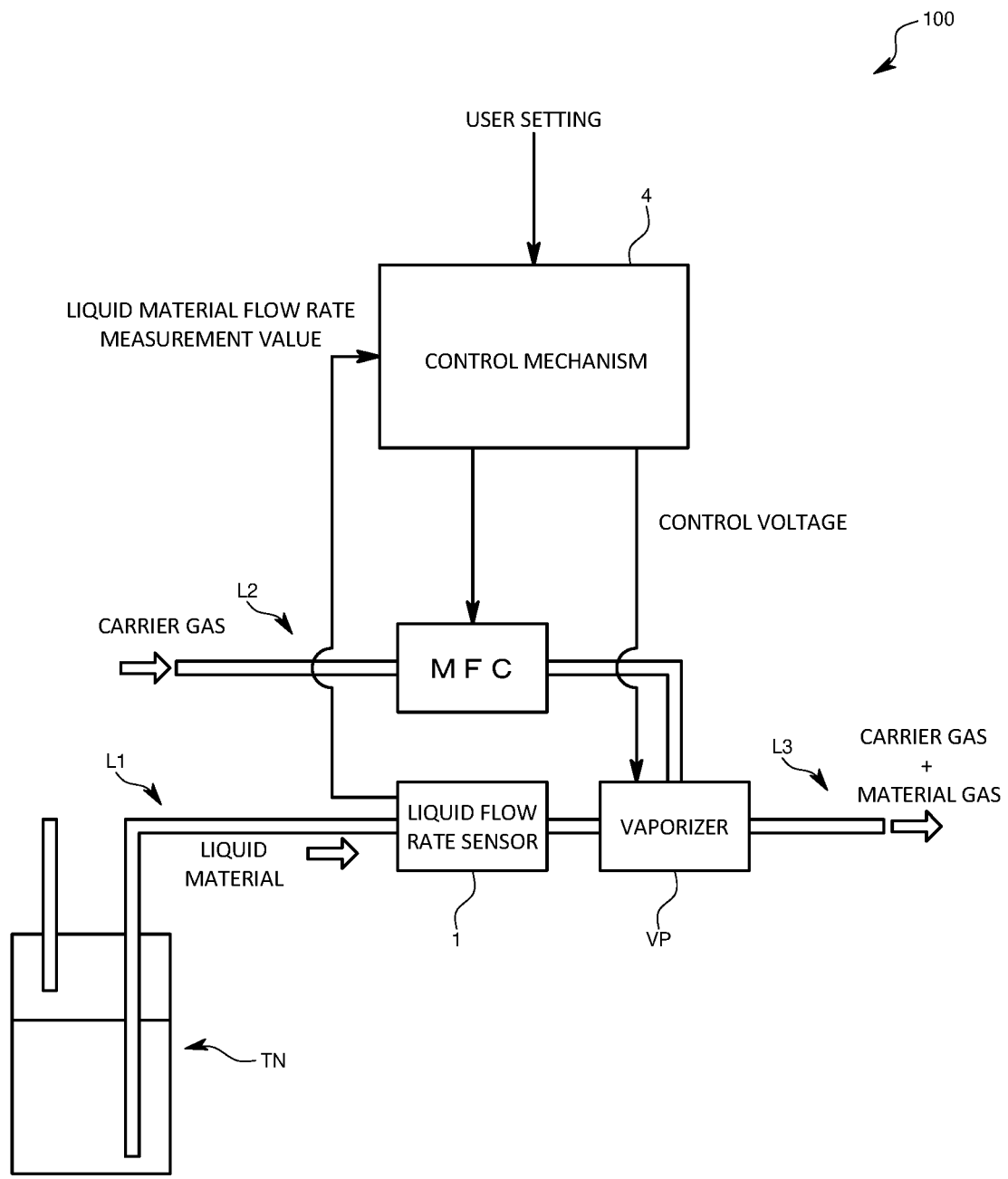
FIG. 1 is a schematic view showing a structure of a vaporization device according to a first embodiment of the present invention.

As is shown in FIG. 1, the vaporization device 100 is provided with a liquid material line L1 along which flows a liquid material, a carrier gas line L2 along which flow a carrier gas, a discharge line L3 through which is discharged a mixture gas that is made up of the carrier gas and a material gas created by vaporizing the liquid material, and a control mechanism 4 that performs the overall control of the devices provided on the respective lines. Here, terminating end portions of the liquid material line L1 and the carrier gas line L2 are connected to an intake side of a vaporizer VP that vaporizes the liquid material, while a leading end portion of the discharge line L3 is connected to a discharge side of the vaporizer VP.

The liquid material line L1 is provided with a tank TN inside which is the liquid material is held, and with a liquid flow rate sensor 1 that is provided on a flow path that connects the tank TN to the vaporizer VP and that measures a flow rate of the liquid material.

A pressure feed gas intake pipe that introduces pressure feed gas, which is used to pressure feed the liquid material, into a gas phase inside the tank TN, and a liquid discharge pipe whose leading end is immersed in the liquid material inside the tank TN, and that forms part of the liquid material line L1 are inserted into the tank TN.

The liquid flow rate sensor 1 is, for example, a pressure-type flow rate sensor and is provided with a laminar flow element, an upstream-side pressure sensor that is provided on an upstream side from the laminar flow element and a downstream-side pressure sensor that is provided on a downstream side from the laminar flow element, and a flow rate calculation board or the like that calculates a flow rate of the liquid based on outputs from the respective pressure sensors (none of these are shown in the drawings). For example, in the flow rate sensor 1 the flow rate of the liquid material flowing through the liquid material line L1 is calculated based on differential pressures in the laminar flow element, and on a difference of squares of the respective pressures and the like, and this flow rate is then output to the control mechanism 4.

On the carrier gas line L2 there is provided a mass flow controller MFC that controls the flow rate of a carrier gas in the form of nitrogen or the like that is flowing into the vaporizer VP. The mass flow controller MFC is formed by packaging a valve, flow rate sensor, and control board (not shown in the drawings) into a single unit, and controls an aperture of the valve by performing feedback control that is based on a deviation between a set flow rate that is set in advance and a flow rate measured by the flow rate sensor.

Figure 2:
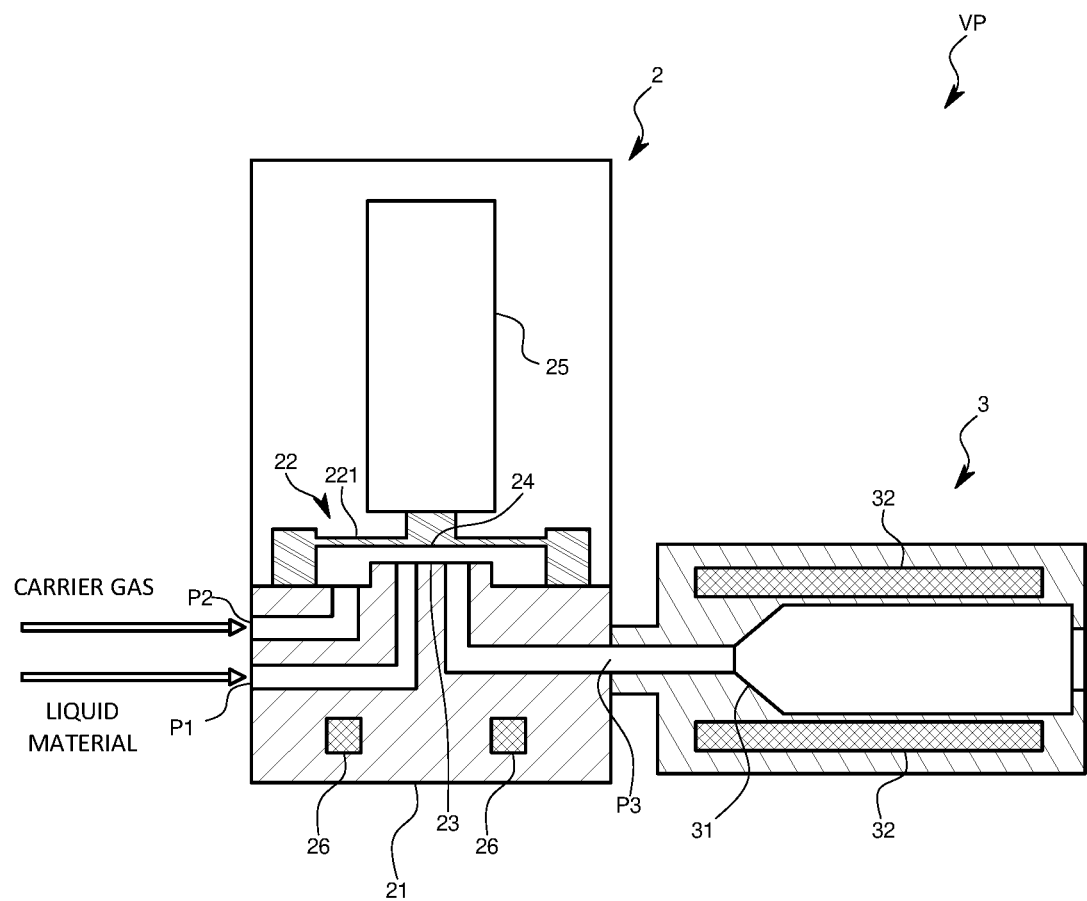
FIG. 2 is a schematic view showing details of a vaporizer in the first embodiment.

As is shown in the schematic view in FIG. 2, the vaporizer VP is provided with a control valve 2, and with a vaporizing portion 3 that is provided on the downstream side from the control valve 2 and adjacent thereto.

A flow path is formed inside the control valve 2. Moreover, the control valve 2 is provided with a metal body 21 on whose upper surface is formed a valve seat 23, a metal diaphragm structure 22 that is equipped with a diaphragm 221 that is provided on an upper surface of the body 21 and that functions as a valve body 24 that moves reciprocatingly in relation to the valve seat 23, and a piezo actuator 25 which is an actuator that drives the diaphragm 221. An aperture between the valve seat 23 and the valve body 24 is adjusted by the piezo actuator 25 and, in this first embodiment, this enables the flow rate of the liquid material to be controlled. Moreover, because the body 21 and the diaphragm structure 22 are formed from metal, if there is a decrease in temperature, the distance between the valve seat 23 and the valve body 24 increases due to thermal contraction. Conversely, if there is an increase in temperature, the distance between the valve seat 23 and the valve body 24 decreases due to thermal expansion. Accordingly, even if the same voltage is being applied to the piezo actuator 25, if there is a change in temperature, there is a possibility that the aperture will also change.

A liquid intake port P1 through which the liquid material from the liquid material line L1 is introduced into the interior of the body 21, and a gas intake port P2 through which carrier gas from the carrier gas line L2 is introduced into the interior of the body 21 are formed in a side surface of the body 21 of the control valve 2. In addition, the liquid material and carrier gas that have been introduced into the interior of the body 21 flow through the internal flow path into a gas-liquid mixing portion that is formed in the space between the upper surface of the body 21 and the diaphragm structure 22, and are mixed together in this gas-liquid mixing portion. The gas-liquid mixture created by mixing the liquid material and the carrier gas together passes through the internal flow path, and is discharged to the outside through the liquid discharge port P3 formed in a side surface of the body 21. In the first embodiment, the discharge port of the control valve 2 is connected to an inflow aperture of the vaporizing portion 3, which is located adjacent to a rear stage of the control valve 2.

Furthermore, a valve heater 26 is built into the body 21 so that the interior of the control valve 2 can be adjusted so as to be maintained at a predetermined temperature. For example, the temperature of the control valve 2 is set to a temperature that is higher than that of the liquid material inside the tank TN and is lower than the temperature of the vaporizing portion 3 where the liquid material is vaporized. In other words, the temperature adjusted by the valve heater 26 is set so as to enable the liquid material introduced into the vaporizing portion 3 to be preheated in the control valve 2 and be more easily vaporized, but not so as to cause the liquid material to be vaporized inside the control valve 2.

The vaporizing portion 3 is formed so as to heat and decompress the gas-liquid mixture so that this is vaporized and a material gas thereby generated. More specifically, the vaporizing portion 3 is provided with a nozzle 31 where the flow path diameter progressively expands towards the downstream side, and a vaporization heater 32 that heats the gas-liquid mixture that is flowing through the nozzle 31.

Here, in a case in which, in particular, the control valve 2 is opened up from a fully closed state so that the liquid material flows rapidly into the vaporizer VP, because of heat absorption from the liquid material itself, or due to the liquid material being vaporized in the vaporizing portion 3, the temperature of the control valve 2 temporarily decreases in spite of the fact that the control valve 2 is being heated by the valve heater 26. More specifically, if the flow rate of the liquid material is changed in a stepped configuration from a state of zero, the temperature of the control valve 2 gradually decreases from the initial temperature thereof in the fully closed state, and becomes held at an equilibrium temperature at which the heat absorption generated by the vaporization and the like of the liquid material is balanced by the heating provided by the heater 26.

Figure 3:
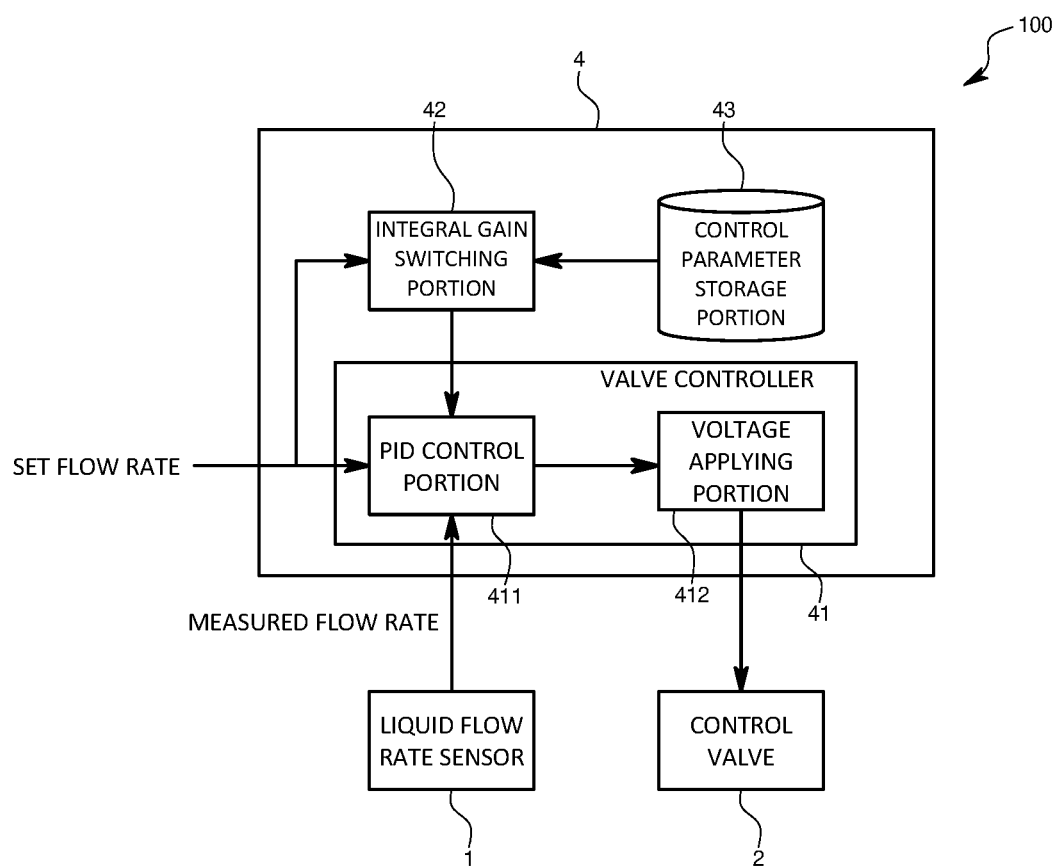
FIG. 3 is a function block diagram showing a structure of a control mechanism in the first embodiment.
Figure 4:
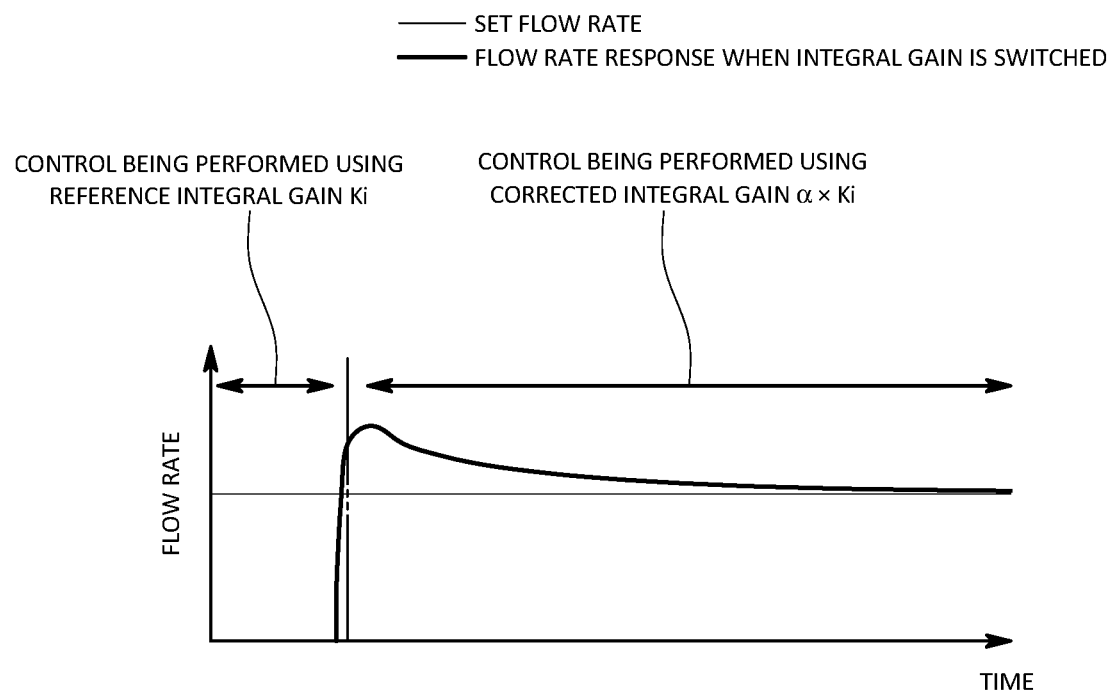
FIG. 4 is an image diagram showing a switching timing of an integral gain in the first embodiment.

The functions of the control mechanism 4 are achieved as a result of a computer that is provided with a CPU, memory, an A/D converter, a D/A converter and various input/output devices and the like operating in collaboration with various other devices. In the first embodiment, the control mechanism numeral 4 controls operations of the mass flow controller MFC and the vaporizer VP based on settings input by a user. As the set flow rate of the carrier gas, the control mechanism 4 inputs into the mass flow controller MFC a target command that has been fixed using particular set values in such a way that, for example, the carrier gas is continuously supplied at a fixed flow rate. Moreover, in the control valve 2 of the vaporizer VP, the control mechanism 4 controls the aperture of the control valve 2 using PID control based on a set value which shows a set flow rate for the liquid material that has been set by the user, and on a measurement value measured by the liquid flow rate sensor 1. Furthermore, the control mechanism 4 is characterized in that the integral gain is switched while the control is being performed by the control valve 2, and in particular while the step commands are being controlled. More specifically, as a result of a program for the vaporization device 100 that is stored in the memory being executed, the various devices operate in mutual collaboration with each other so that the control mechanism 4 performs at least the functions of a valve controller 41, an integral gain switching portion 42, and a control parameter storage portion 43 that are shown in FIG. 3. Each of these portions is described below in detail.

The valve controller 41 controls the aperture of the control valve 2 using PID control based on a set value which shows a set flow rate for the liquid material that has been set by the user, and on a measurement value for the flow rate that has been measured by the liquid flow rate sensor 1. This valve controller 41 is provided with a PID control portion 411 that performs a PID calculation based on a deviation between the set value and the measurement value of the liquid material flow rate and on a set PID gain, and that calculates a target value for an applied voltage, which is a manipulated variable, and with a voltage applying portion 412 that outputs a voltage to the control valve 2 such that the target value for the applied voltage output from the PID control portion 411 is achieved. Here, the PID gain set in the PID control portion 411 includes proportional gain, integral gain, and derivative gain. In the first embodiment, the integral gain is switched from one particular value to another value while control is being performed. In contrast, the proportional gain and the derivative gain remain constantly fixed.

During a transient response period of the flow rate that is measured by the liquid measurement sensor 1, the integral gain switching portion 42 switches the integral gain set in the valve controller 41 from a reference integral gain to a corrected integral gain. For example, as is shown in the image diagram in FIG. 4, in a case in which a step function is input as the set flow rate, the integral gain switching portion 42 sets a reference integral gain until just before the flow rate measured by the liquid flow rate sensor 1 reaches a peak value, and thereafter sets a corrected integral gain. Here, taking as an example a case in which a step function in which the initial value is, for example, zero is input as the set flow rate, the term 'transient response period of the flow rate' refers to a period whose starting point is the rise start point when the measured flow rate changes to a value other than the initial value of zero, and whose end point is a point after a predetermined time has elapsed from the peak point when the measured flow rate reached the peak value. Note that, in a case in which a temperature rise is generated either in the valve seat 23 or the valve body 24 of the control valve 2, and the measurement value of the flow rate generated by the resulting aperture increase remains held in a state of being larger than the set value, then it is also possible for the measurement value of the flow rate that is measured after the predetermined time has elapsed since the peak point in time to be larger, for example, than the set value. Furthermore, in a case in which, due to a combination of the properties of the materials forming the control valve 2, the properties of the liquid material, and the amount of heating and the like, there is a temperature reduction in the valve seat 23 or the valve body 24, and overshoot is generated by the reduction in the aperture subsequently followed by undershoot, so that the measurement value of the flow rate remains held in a state of being smaller than the set value, then it is also possible for the measurement value of the flow rate that is measured after the predetermined time has elapsed since the peak point in time to be smaller, for example, than the set value. Expressing this another way, the transient response period may also be defined as a period from when the flow rate starts rising from the state in which it had been held at the initial value and reaches the peak value, until the point when the flow rate converges on the set value showing the set flow rate. In addition, if the end point is taken as the peak point, then the transient response period may also be defined in even stricter terms as a rise period that extends from the rise starting point until the peak point.

The values of the reference integral gain and the corrected integral gain, as well as the conditions determining the use of these integral gains are mutually associated with each other and stored in the control parameter storage portion 43.

The reference integral gain is an integral gain that is set, for example, so as to conform with the characteristics of the control valve 2 when this is being held at a normal operating temperature by the valve heater 26. More specifically, the reference integral gain is a value that is set in such a way that, in a fluid control system that is formed solely by the control valve 2 and the liquid flow rate sensor 1 and without the vaporizing portion 3 being provided, the settling time of the step response is contained within an allowed time that has been set in advance. Here, the allowed time is, for example, a value that is decided from the limiting conditions and the like that are desired in the flow rate of the material gas introduced into the chamber. Moreover, the reference integral gain may be a value that is determined by means of a computer simulation or may be a value that is obtained via experiment.

In contrast, the corrected integral gain is set so as to conform with the operating characteristics of a fluid control system that is provided not only with the control valve 2 and the liquid flow rate sensor 2, but also with the vaporizing portion 3. More specifically, the corrected integral gain is set in such a way that the settling time of the step response in a case in which there is a switch from the reference integral gain to the corrected integral gain during the transient response period of the flow rate is contained within the above-described allowed time. For example, assuming that the reference integral gain has been determined using the above-described method, a search is made for a value that enables the settling time in a case in which the reference integral gain is modified to a different integral gain during the transient response period to be contained within the above-described allowed time. An integral gain obtained as a result of this search that satisfies the conditions is then used as the corrected integral gain. In the first embodiment, a corrected integral gain whose value is larger than that of the reference integral gain is set. For example, a value $\alpha \times Ki$ obtained by multiplying a correction coefficient $\alpha$ that is larger than 1 by the reference integral gain Ki is used as the corrected integral gain.

Furthermore, in the first embodiment, the timing at which the integral gain switching portion 42 switches from the reference integral gain to the corrected integral gain is triggered by the rise starting point of the set flow rate. More specifically, after a predetermined time has elapsed with the rise starting point when the set value of the set flow rate changes from zero to a predetermined flow rate value taken as a reference point, the integral gain switching portion 42 switches the integral gain set in the valve controller 41 from the reference integral gain to the corrected integral gain. In the first embodiment, the integral gain switching portion 42 switches from the reference integral gain to the corrected integral gain during the transient response period of the flow rate of the liquid material that is measured by the liquid flow rate sensor 1. As an example, the integral gain is switched from the reference integral gain to the corrected integral gain at a time that is subsequent to the rise starting point of the flow rate of the liquid material, but is before the reference peak point in a case in which the integral gain is controlled while being fixed at the reference integral gain. In other words, the integral gain is switched within the rise period of the flow rate of the liquid material being measured. Note that, as is described below, in order to not only cancel out offset, but so as to also reduce the overshoot amount and further shorten the settling time, it is preferable that the integral gain be switched from the reference integral gain to the corrected integral gain at a time that is subsequent to the rise starting point of the flow rate of the liquid material, but is before the flow rate reaches a step value in the set flow rate.

A step response relating to the flow rate control of the liquid material in the vaporization device 100 of the first embodiment that is formed in this manner will now be described in comparison to a step response of a conventional structure in which the reference integral gain is fixed.

Figure 5:
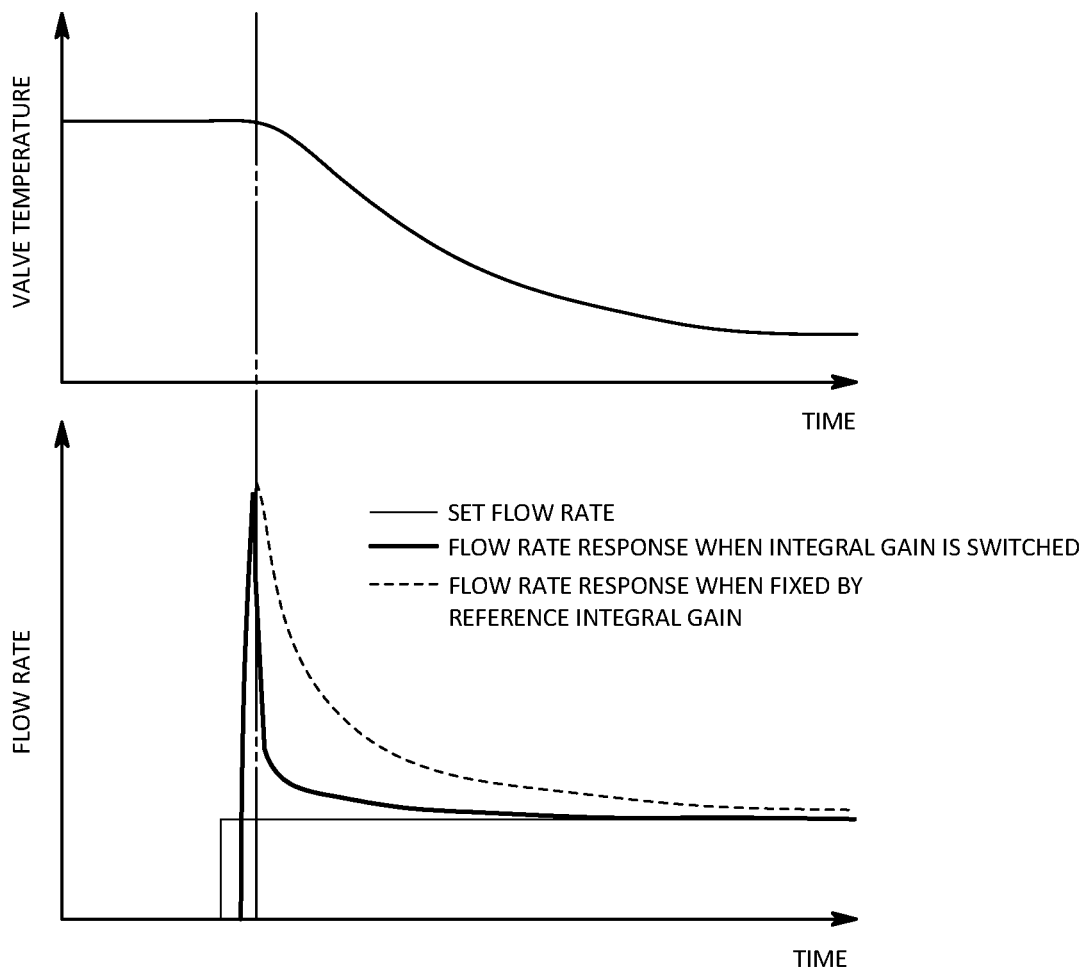
FIG. 5 is a graph showing a change in a valve temperature at a rise in the flow rate of a liquid material, and a step response at a first setting in the vaporization device of the first embodiment together with a step response of a conventional vaporization device.

As is shown in FIG. 5, when a step function whose initial value is zero is input as the set flow rate, from the vicinity of the rise starting point of the set flow rate, the valve temperature decreases at a first order lag from the initial temperature to the final temperature. If, as a result of this temperature decrease, PID control that, as in the conventional technology, is fixed at the reference integral gain is then performed, the time for which the offset (i.e., steady-state deviation) between the flow rate set value and the flow rate measurement value is maintained after the overshoot has been generated is prolonged. In other words, in this conventional example, due to the temperature decrease, the settling time cannot be contained within the allowed time.

Figure 6:
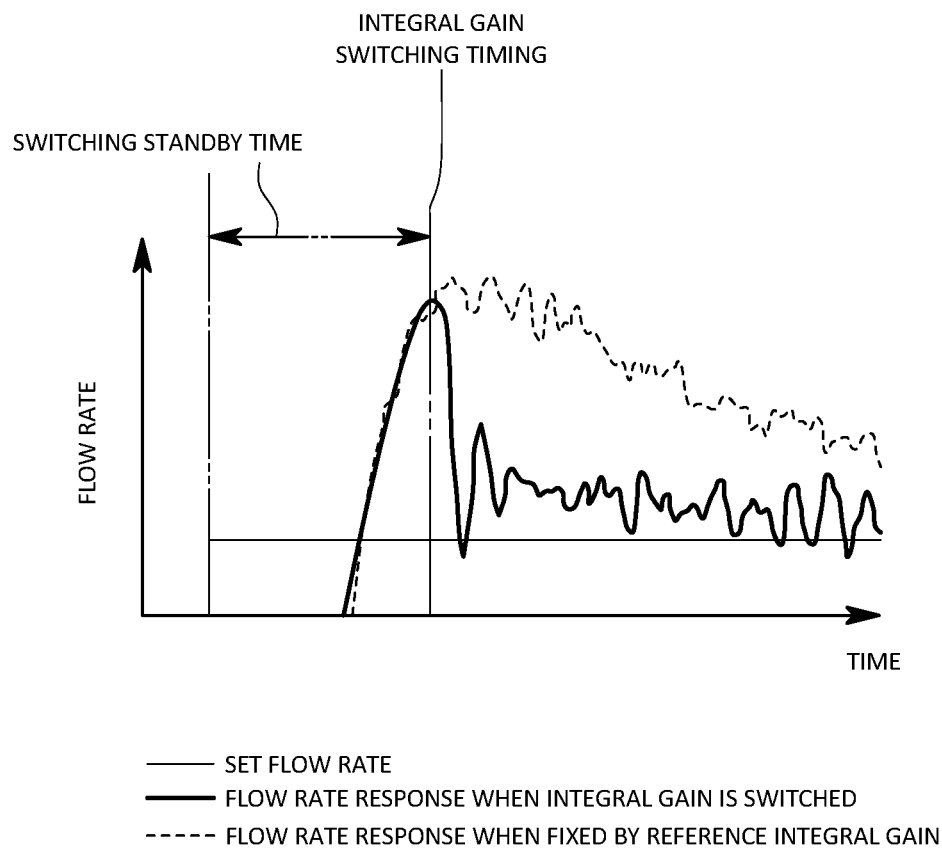
FIG. 6 is an enlarged view of a peak portion from FIG. 5 showing an integral gain switching timing and flow rate convergence state.

In contrast to this, as is shown in FIG. 6, in the vaporization device 100 of the first embodiment, although the overshoot amount is substantially the same as in the conventional example if the reference integral gain is switched to the corrected integral gain at the reference peak point when flow rate being measured reaches a peak, it can be seen that, after the switch to the corrected integral gain, the offset is rapidly canceled out. In particular, hunting or the like does not occur in the period after the switch to the corrected integral gain.

Next, a case in which the timing at which the integral gain is switched in the vaporization device 100 of the first embodiment is set even earlier will be described with reference to FIG. 7 and FIG. 8. More specifically, as is shown in FIG. 8, the reference integral gain is switched to the corrected integral gain at a timing that is earlier than the above-described reference peak point, and is a point when the measurement value of the flow rate of the liquid material is smaller than the set value.

Figure 7:
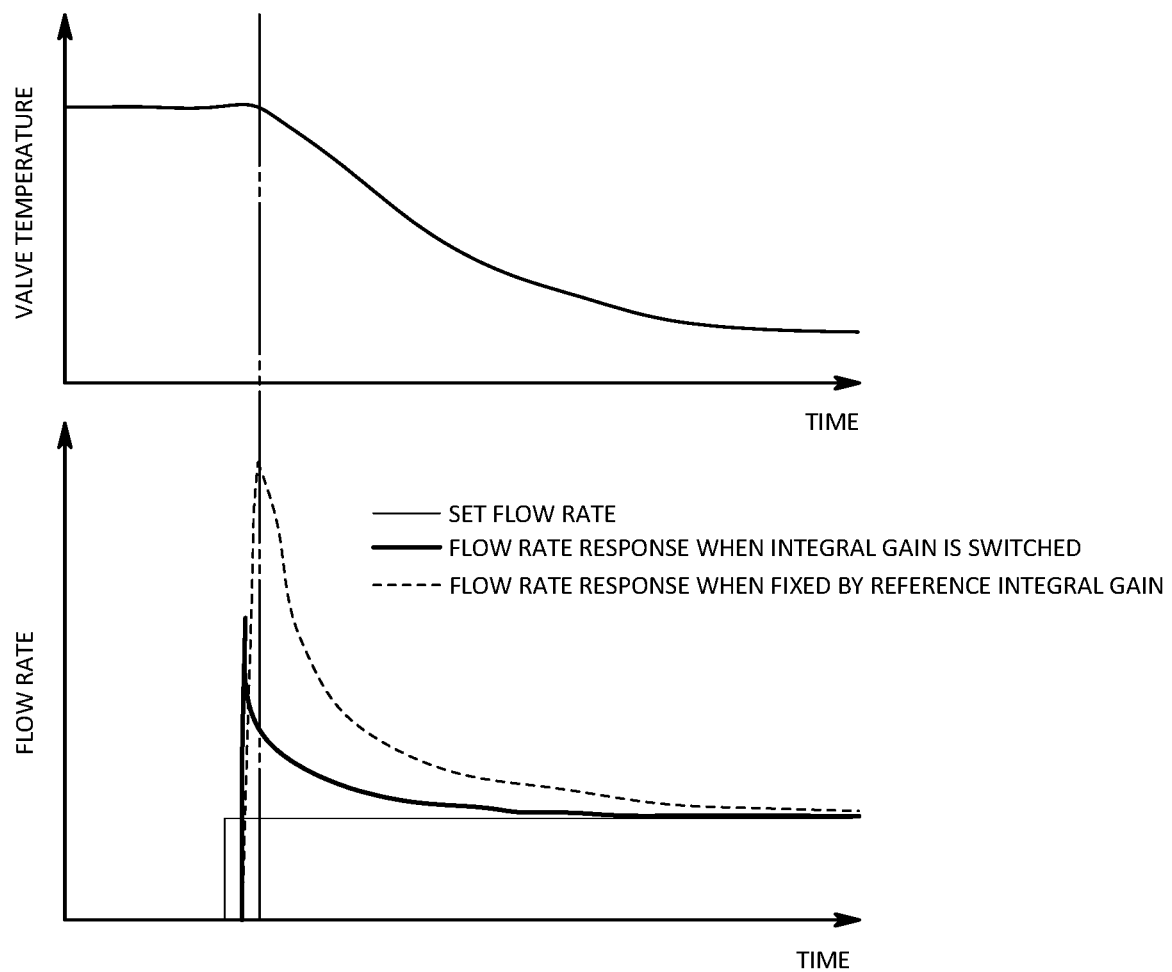
FIG. 7 is a graph showing a change in a valve temperature at a rise in the flow rate of a liquid material, and a step response at a second setting in the vaporization device of the first embodiment together with a step response of a conventional vaporization device.
Figure 8:
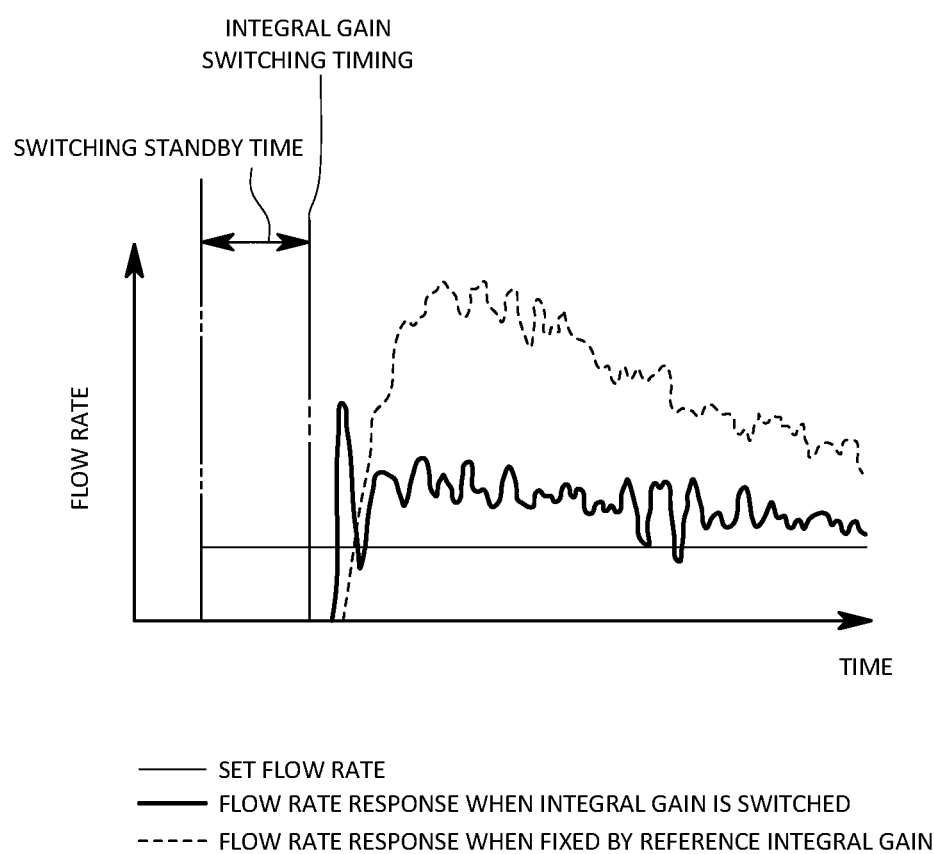
FIG. 8 is an enlarged view of a peak portion from FIG. 7 showing an integral gain switching timing and flow rate convergence state.

If the switching of the integral gain is performed at this timing, then as is shown in FIG. 7 and FIG. 8, it can be seen that, compared to the conventional example, the vaporization device 100 of the first embodiment enables the amount of overshoot to be reduced, and also enables the settling time to be further shortened. Moreover, even if the corrected integral gain is switched at this timing, there is no particular evidence of hunting and the like occurring.

In this way, by employing the vaporization device 100 of the first embodiment, the integral gain switching portion 42 is able to switch from the reference integral gain to the corrected integral gain which is larger than the reference integral gain during the transient response period of the flow rate of the liquid material. As a result, even if the commencement of the vaporization of the liquid material causes the temperature of the control valve 2 to be considerably reduced so that thermal contraction of the metals and the like forming the control valve 2 occurs, it is still possible to obtain the necessary aperture to cancel out the offset. Moreover, because the offset is canceled out, the settling time can also be shortened to within the allowed time.

Furthermore, because the predetermined time from the rise start point of the liquid material is controlled by the reference integral gain, no excessive manipulated variables are input into the control valve 2 during the transient response period, and neither is there any occurrence of large-scale overshoot or hunting. In other words, if control is always performed using a corrected integral gain that is greater than the reference integral gain, although there is a possibility of the flow rate control becoming unstable, in the vaporization device 100 of the first embodiment, because PID control is performed initially using a low reference integral gain, it is difficult for this problem of unstable flow rate control to occur. Accordingly, in the vaporization device 100 it is possible to achieve both an improvement in responsiveness and stable control.

Next, variant examples of the vaporization device 100 of the first embodiment will be described.

It is also possible to employ a structure in which, after the integral gain switching portion 42 has made the switch from the reference integral gain to the corrected integral gain, it switches back to the reference integral gain once a predetermined time has elapsed with the measurement value of the flow rate of the liquid material being maintained at the set value. If this type of structure is employed, then even if turbulence is input while the flow rate is being maintained, it is difficult for such turbulence to have any effect so that the structure is made more robust.

The timing at which the switch from the reference integral gain to the corrected integral gain is performed is not limited to the rise period during the transient response period as has been described in the first embodiment. In other words, it is also possible for the integral gain to be switched outside the rise period during the transient response period. In the first embodiment, the switching of the integral gain is performed during the rise period, however, it is also possible to perform the switching of the integral gain during the period, for example, after the peak point has passed and the flow rate of the liquid material has decreased until the set value of the set flow rate is reached. Moreover, it is also possible to perform the switching of the integral gain during a portion of the rise period that is subsequent to the point when the step value of the set flow rate is reached and is before the peak point is reached.

Moreover, it is also possible for the integral gain switching portion 42 to set the timing of the switch from the reference integral gain to the corrected integral gain in accordance with the size of the set value showing the set flow rate. For example, taking the rise starting point of the flow rate of the liquid material as a reference, it is possible for the switching timing to be progressively delayed as the difference between the set value showing the set flow rate and the initial value becomes larger. It is also possible for the integral gain switching portion 42 to be formed in such a way as to set the switching timing when the reference integral gain is switched to the corrected integral gain in accordance with the type of liquid material. For example, the switching timing may be set in accordance with physical properties such as the specific heat and viscosity and the like of the liquid material.

In the vaporization device 100 of the first embodiment, the valve controller 41 controls the control valve 2 using PID control, however, it is also possible for this control to be performed using, for example, PI control. Even if PI control is employed, by switching from the reference integral gain to the corrected integral gain, it is possible to maintain control stability while improving the control characteristics in the same way as when employing the vaporization device 100 of the first embodiment.

Furthermore, in the first embodiment a structure is employed in which only the integral gain is switched, however, it is also possible for a proportional gain and a derivative gain to be switched in addition to the integral gain. In other words, it is sufficient if the vaporization device 100 is a device that switches at least the integral gain. In a case in which a plurality of gains are switched, then either each gain may be switched at the same time, or the switching timings of the respective gains may be mutually offset from each other. In addition, the switchings of the integral gain do not necessarily need to be performed consecutively, and it is also possible for the changes from the reference integral gain to the corrected integral gain to be performed consecutively within a predetermined length of time. In other words, the 'switching of the integral gain' is not limited to being defined by a discontinuous function, and may also be defined by a continuous function.

In the first embodiment, the set flow rate is a step function whose initial value is zero, however, applications and objects of the present invention are not limited to this. For example, even in a case in which a step function whose initial value is held at a small flow rate, but then from partway through increases to a large flow rate is input as the set flow rate, it may be considered that the temperature of the control valve 2 will be considerably lowered by a large change in the amount of vaporization. It may also be considered that problems relating to the offset and settling time that are caused by this type of temperature decrease of the valve 2 can be solved by switching the integral gain in the same way as in the first embodiment. Furthermore, the function that is input as the set flow rate is not limited to being a step function and it is also possible for the initial value and the final set value to be connected via a ramp function, for example. Moreover, the initial value and the final set value may also be connected together using various types of methods such as, for example, S-interpolation and the like. In addition, in the first embodiment the timing of the switch from the reference integral gain to the corrected integral gain is determined so as to ensure, for example, that the settling time of the step response is contained within an allowed time, however, it is also possible for this determination to be made based on the settling times of various types of flow rate responses. For example, the timing of the switching of the integral gain may be set in such a way that the settling time of a ramp response is contained within the allowed time, or may be set based on the settling time of the flow rate response in a case in which a set flow rate obtained by performing S-interpolation between the initial value and the final set value is input. Furthermore, it is also possible to determine the timing of the switching of the integral gain based on the settling time of a flow rate response in a case in which a set flow rate obtained by performing an interpolation between the initial value and the final target value using various methods and functions other than those described above is input.

It is also possible for the vaporizing portion 3 to vaporize a liquid material using only decompression, or to perform this vaporization using only heat.

Figure 9:
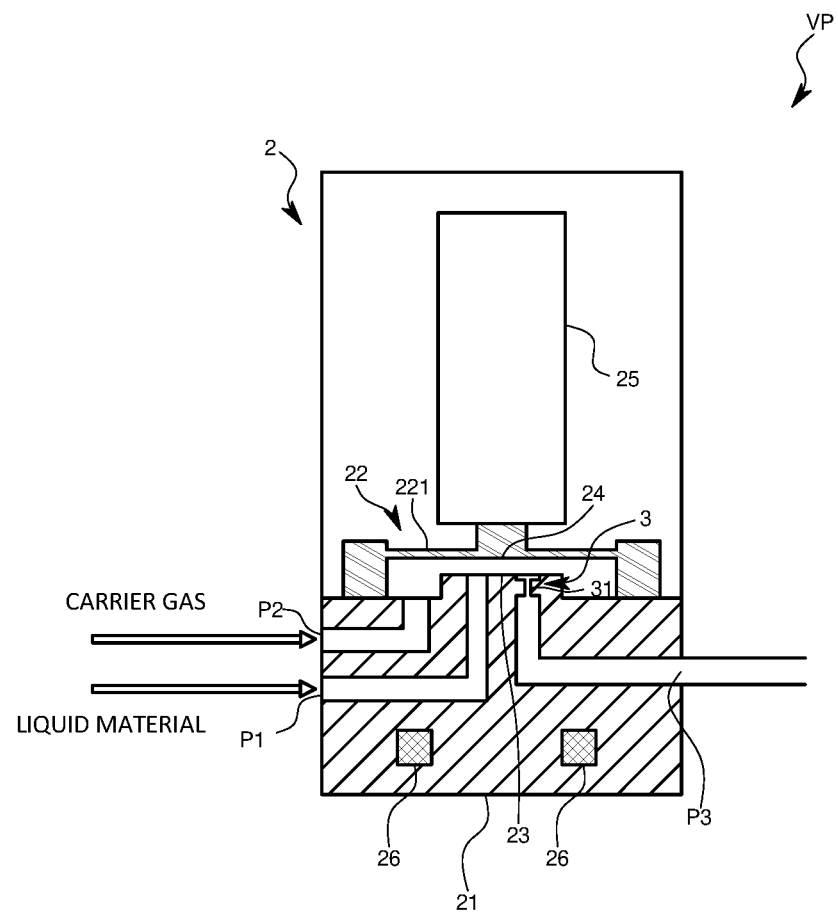
FIG. 9 is a schematic view showing a variant example of the vaporization device of the first embodiment of the present invention.

As is shown in FIG. 9, it is also possible for the control valve 2 and the vaporizing portion 3 to be integrated into a single unit in the vaporizer VP. In other words, the vaporizing portion 3 may be formed by forming in the body 21 of the control valve 2 a nozzle 31 where the surface area of the flow path connecting the valve seat 23 to the liquid discharge port P3 is reduced. In a case such as this, the portion of the body 21 that forms the flow path from the liquid intake port P1 and the gas intake port P2, which are on the upstream side, as far as the valve seat 23, the diaphragm structure 22, and an actuator such as the piezo actuator 25 and the like form the control valve 2, while the nozzle 31 that is formed on the downstream side from the valve seat 23 in the body 21 forms the vaporizing portion 3. Moreover, it is also possible to make the control point of the liquid material in the control valve 2 coincide with the vaporization point in the vaporizing portion 3. In other words, it is also possible to employ a structure in which, instead of providing the nozzle 32, by using the actual gap itself between the valve seat 23 and the valve body 24 of the control valve 2 as the vaporizing portion 3, the flow rate control and the vaporization can both be performed simultaneously using a single structure. To describe this another way, it is also possible for the actual valve seat 23 and valve body 24 themselves of the control valve 2 to form the vaporizing portion 3. Consequently, as far as the positional relationship between the control valve 2 and the vaporizing portion 3 is concerned, there may be cases in which the control valve 2 and the vaporizing portion 3 are both at the same point on the upstream side, and there might also be cases when the vaporizing portion 3 is located further to the downstream side than the control valve 2.

In the vaporization device 100 of the first embodiment, a structure is employed in which problems relating to flow rate control that are caused by a decrease in the temperature of the control valve 2 that causes a subsequent increase in the aperture are solved by switching the integral gain within the transient response period, however, this structure and method may also be employed in the same way to solve problems relating to flow rate control that are caused by an increase in the temperature of the control valve 2 that causes a subsequent reduction in the aperture.

The control mechanism 4 may also be additionally provided with a corrected integral gain modifying portion 44 that modifies the corrected integral gain. Here, the corrected integral gain modifying portion 44 may be formed so as to modify the corrected integral gain itself, or may be formed so as to modify the values making up the corrected integral gain. Modes of modifying the values making up the corrected integral gain include, for example, in a corrected integral gain $\alpha \times Ki$, which value is obtained by multiplying a correction coefficient $\alpha$ by the reference integral gain Ki, at least one of a mode in which the reference integral gain Ki is modified or a mode in which the correction coefficient $\alpha$ is modified. The corrected integral gain modifying portion 44 of the present embodiment modifies the correction coefficient $\alpha$, and then outputs the modified correction coefficient $\alpha$ to the control parameter storage portion 43.

Here, the correction coefficient $\alpha$ is modified using temperature-related parameters that relate to the temperature decrease of the control valve 2. Examples of these temperature-related parameters include the type of liquid material, the set flow rate of the liquid material, the set pressure of the liquid material, the set flow rate of the carrier gas, the measured flow rate of the liquid material, the measured pressure on the upstream side from the control valve 2, the measured pressure on the downstream side from the control valve 2, the set temperature of the control valve 2, the set temperature of the vaporizing portion 3, and the peripheral temperature and the like.

The temperature-related parameters will now be described. The type of liquid material is data that shows the physical properties thereof such as the viscosity and specific heat, the concentration of the liquid material, and the name of the liquid material. The set flow rate of the liquid material, the set pressure of the liquid material, the set flow rate of the carrier gas, and the set temperature of the control valve 2 are set values that are input into the valve controller 41, and may be either signals that accompany the inputting of the set values into the valve controller 41, or values obtained by performing a conversion calculation on these set values. The measured flow rate of the liquid material may be a measurement value obtained by the liquid flow rate sensor 1, a signal showing the measurement value obtained by the liquid flow rate sensor 1, or a value obtained by performing a conversion calculation on the measurement value. The measured pressure on the upstream side from the control valve 2, and the measured pressure on the downstream side from the control valve 2 may be measurement values obtained by a pressure sensor (not shown in the drawings), signals showing the measurement values obtained from a pressure sensor (not shown in the drawings), or values obtained by performing a conversion calculation on the measurement values. The peripheral temperature is the temperature around the vaporizer VP or the liquid flow rate sensor 1 within the vaporization device 100, and the measurement value of the peripheral temperature may be a signal showing the measurement value obtained by a temperature sensor (not shown in the drawings), or a value obtained by performing a conversion calculation on the measurement value.

The corrected integral gain modifying portion 44 modifies the corrected integral gain to the correction coefficient $\alpha$ that is obtained using relationship data that shows a relationship between the above-described temperature-related parameters and the correction coefficient $\alpha$. The relationship data may be in a formula format in which the relationship between at least one of the temperature-related parameters (for example, the type of liquid material, the set temperature, or the set flow rate) and the correction coefficient $\alpha$ is expressed as a formula, a table format in which the relationship between at least one of the temperature-related parameters and the correction coefficient $\alpha$ is expressed as a table, or a graph format in which the relationship between at least one of the temperature-related parameters and the correction coefficient $\alpha$ is expressed as a graph.

Here, in a case in which the temperature-related parameters used in the relationship data are formed solely by fixed set values (for example, the set pressure, or set temperature or the like) regardless of any modification of the set flow rate of the liquid material, then it is possible to determine the correction coefficient $\alpha$ using the relationship data by inputting those set values regardless of the state before the modification of the set flow rate of the liquid material and the state thereafter. Note that it is also possible to use a differential between the state before the modification of the set flow rate of the liquid material and the state thereafter as a parameter of the relationship data. In this case, it is desirable that relationship data be created for each differential.

In a case, however, in which the temperature-related parameters used in the relationship data include measurement values (for example the measured flow rate, the measured pressure, and the measured temperature and the like, hereinafter, referred to as 'measurement values for creating relationship data') that change as a result of the set flow rate of the liquid material being modified, then it is possible to determine the correction coefficient $\alpha$ using the relationship data by inputting those measurement values from timings (for example, in the transient response period prior to the modification of the set flow rate of the liquid material, and after the modification of the liquid material) when these measurement value for creating relationship data were measured.

In addition, the relationship data may be stored in a relationship data storage portion (not shown in the drawings) that is provided in the control mechanism 4, or may be stored in a calculation device provided separately from the vaporization device 100.

Figure 10:
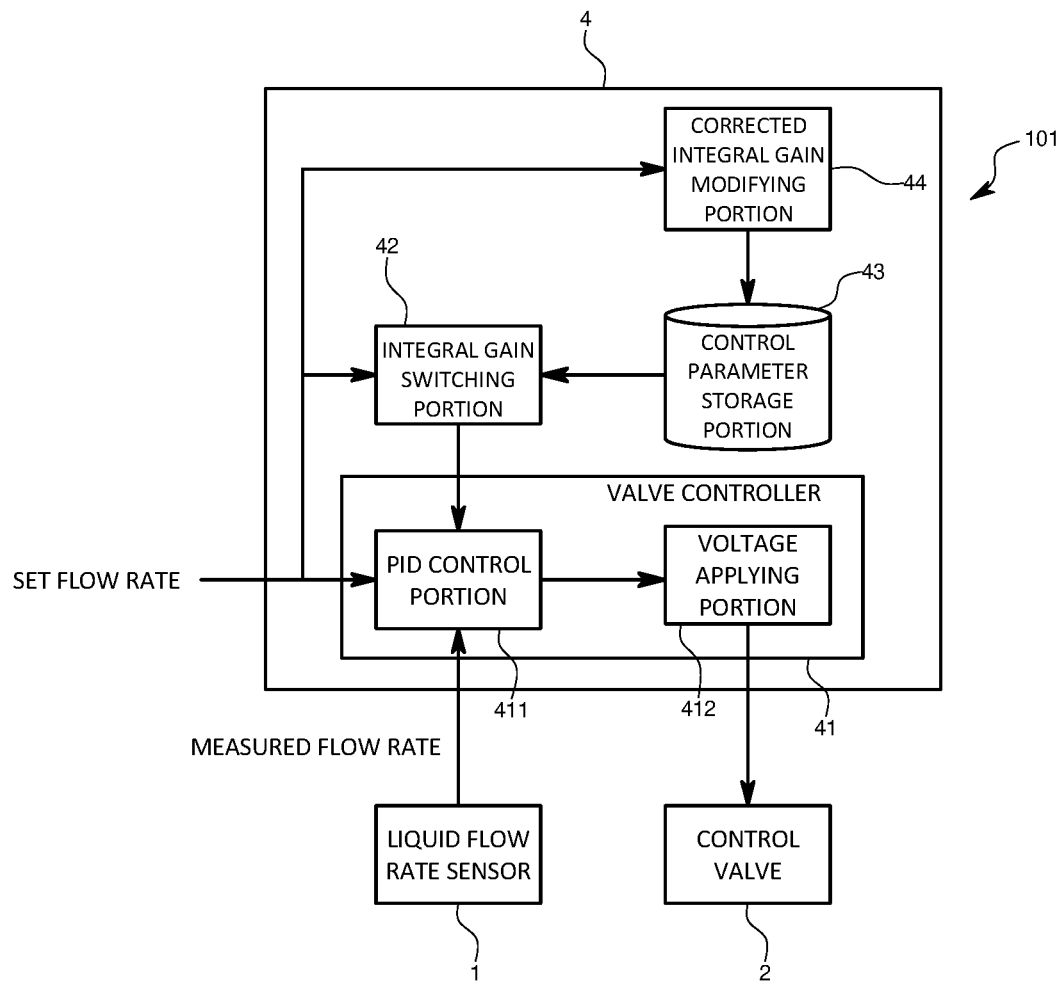
FIG. 10 is a schematic view showing a variant example of the control mechanism of the first embodiment of the present invention.

In a case in which the relationship data is stored in a relationship data storage portion in the control mechanism 4, the corrected integral gain modifying portion 44 modifies the corrected integral gain by determining the correction coefficient $\alpha$ using the relationship data, and outputting this correction coefficient $\alpha$ to the control parameter storage portion 43. Note that, in FIG. 10 an example is shown in which correction coefficient $\alpha$ is determined using the set flow rate of the liquid material or the set pressure of the liquid material.

In contrast, in a case in which the relationship data is stored in a calculation device that is provided separately from the vaporization device 100, then it is possible to determine the correction coefficient α using the relationship data by inputting parameters into this calculation device. By inputting the correction coefficient α into the control mechanism 4, the correction integral gain modifying portion 44 receives the correction coefficient α, outputs it to the control parameter storage portion 43, and modifies the corrected integral gain. Here, examples of modes of inputting parameters into the calculation device include a user inputting the temperature-related parameters, the control mechanism 4 inputting the temperature-related parameters, and a host control device of the control mechanism 4 inputting the temperature-related parameters. In addition, examples of modes of inputting the correction coefficient α obtained by the calculation device into the control mechanism 4 include a user inputting the correction coefficient α into the control mechanism 4, the calculation device inputting the correction coefficient α into the control mechanism 4, and the calculation device transmitting the correction coefficient α to a host control device, and this host control device then inputting the correction coefficient α into the control mechanism 4.

Next, a fluid control device 101 of a second embodiment of the present invention will be described with reference to FIG. 11 and FIG. 12.

In the fluid control device 101 of the second embodiment, the control valve 2 is provided in a usage environment in which a temperature decrease of a predetermined value or greater is generated during the control performed by the valve controller 41 upon, and subsequently to, a rise in the measurement value of the flow rate or pressure being measured by a fluid sensor. In other words, although the fluid control device 101 is different from the vaporization device 100, the temperature of the control valve 2 decreases in conjunction with the starting of a fluid inflow in the same way as in the first embodiment, and in the same way offset is not canceled out via PID control that uses fixed integral gain, and it is not possible for a desired settling time to be obtained.

More specifically, the fluid control device 101 of the second embodiment is a mass flow controller and, as shown in FIG. 9, a plurality of the mass flow controllers 101 are densely concentrated together inside a gas box. Each mass flow controller individually controls the flow rate of a different fluid. Due to the heat and the like generated by the mass flow controllers themselves, the temperature inside the gas box is higher than an environmental temperature such as room temperature or the like. In a case in which the temperature of an inflowing fluid is lower than that of the mass flow controllers, in the same way as in the first embodiment, problems associated with control may be generated as a result of a temperature decrease.

Figure 11:
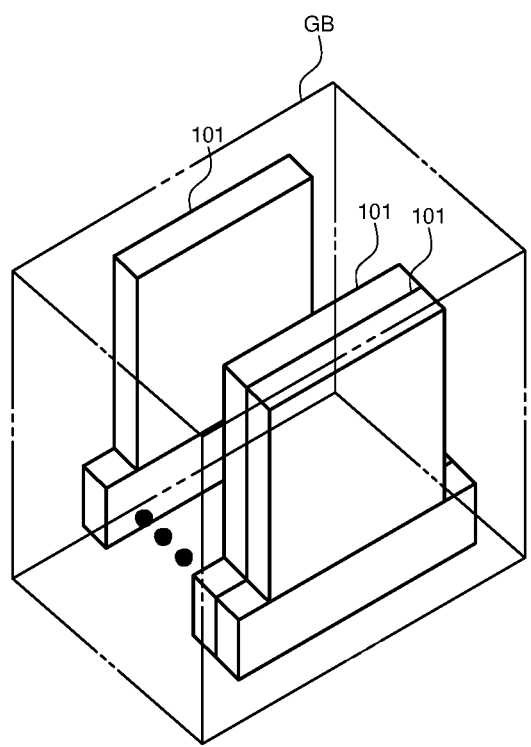
FIG. 11 is a schematic view showing a structure of a fluid control device according to a second embodiment of the present invention.
Figure 12:
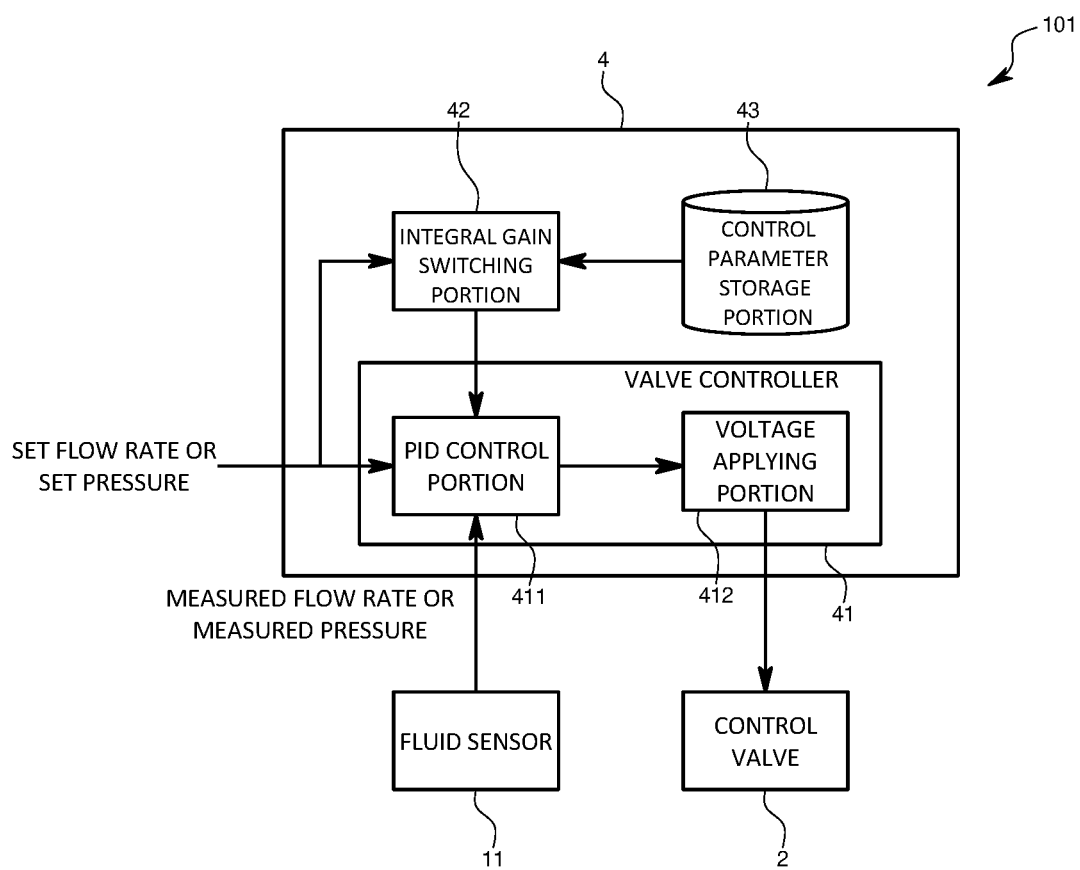
FIG. 12 is a function block diagram showing the structure of a control mechanism in the second embodiment.

As is shown in FIG. 11, each fluid control device 101 of the second embodiment is provided with a control valve 2, a fluid sensor 11 that makes a measurement of the pressure or flow rate, and a control mechanism 4 that controls the aperture of the control valve 2 based on a deviation between a measurement value obtained by the fluid sensor 11 and a set value. Note that the structure of the control mechanism 4 is substantially the same as in the first embodiment, and only the control input and control object are different. In other words, in a case in which a stepped-configuration target command is input into the mass flow controller MFC of the second embodiment that is provided inside the gas box, a structure is employed in which, during the transient response period of the measurement values of a fluid sensor, the integral gain switching portion 42 switches the integral gain set in the valve controller 41 from a reference integral gain to a corrected integral gain.

If the fluid control device 101 of the second embodiment which has this type of structure is employed, then, as in the vaporizer VP of the first embodiment, it becomes possible to not only solve problems such as offset not being canceled out in situations where a temperature decrease of the control valve 2 is likely to occur, or such as it not being possible to shorten the settling time, but to also achieve control stability.

Next, a variant example of the second embodiment will be described.

The fluid control device 101 of the second embodiment is not limited to controlling a flow rate and may also be used to control pressure. In addition, the fluid may be any one of a liquid, a gas, or a gas-liquid mixture. Moreover, the control method employed by the fluid control device 101 of the second embodiment can be applied to any system in which the temperature of the control valve 2 is high but is reduced as a result of the inflow of a fluid. In other words, the present invention is not limited to being used in fluid control devices that are housed inside a gas box such as the one described above, but can be used in a variety of fluid control devices. In addition, even in a case in which there is a rise in the temperature of the control valve 2 due to the inflow of a fluid, it is still possible, for example, to cancel out offset in which the flow rate is reduced relative to the set value, and to shorten the settling time. In other words, provided that the control valve is provided in a usage environment in which, during the control performed by the valve controller, a temperature change of a predetermined value or greater is generated subsequent to a rise of a measurement value that is measured by a fluid sensor, then the present invention can be effectively employed.

In the same way as in the first embodiment, in the second embodiment as well, the control mechanism 4 may be additionally provided with the corrected integral gain modifying portion 44 that modifies a corrected integral gain.

Furthermore, it should be understood that the present invention is not limited to the above-described embodiment, and that various modifications and the like may be made thereto insofar as they do not depart from the spirit or scope of the present invention.

DESCRIPTION OF THE REFERENCE CHARACTERS

100 . . . Vaporization Device
1 . . . Fluid Flow Rate Sensor
2 . . . Control Valve
3 . . . Vaporizing Portion
4 . . . Control Mechanism
41 . . . Valve Controller
42 . . . Integral Gain Switching Portion
101 . . . Fluid Control Device
11 . . . Fluid Sensor
GB . . . Gas Box

What is claimed is:
1. A vaporization device comprising:
a control valve that is provided on a flow path along which flows a liquid material;
a vaporizing portion in which the liquid material is vaporized by decompression or heating;
a liquid flow rate sensor that measures a flow rate of a liquid material flowing along the flow path; and a valve controller that controls the control valve using PI control or PID control that is based on a set value showing a set flow rate and on a measurement value of the flow rate that is measured by the liquid flow rate sensor, wherein
the vaporization device further comprises an integral gain switching portion that, during a transient response period of the flow rate that is measured by the liquid flow rate sensor, switches an integral gain set in the valve controller from a reference integral gain to a corrected integral gain that is different from the reference integral gain.

2. The vaporization device according to claim 1, wherein the corrected integral gain is set to a value that is higher than a value of the reference integral gain.

3. The vaporization device according to claim 1, wherein the reference integral gain is a value that is set in such a way that, in a case in which the vaporizing portion is not present, a settling time of a flow rate response is within an allowed time that has been set in advance.

4. The vaporization device according to claim 3, wherein the corrected integral gain is a value that is determined in such a way that, in a case in which the vaporizing portion is present, and there is a switch from the reference integral gain to the corrected integral gain during the transient response period, a settling time of a flow rate response is within the allowed time.

5. The vaporization device according to claim 1, wherein the integral gain switching portion restores an integral gain that has been set in the valve controller after the measurement value has been converged at the set value from the corrected integral gain to the reference integral gain.

6. The vaporization device according to claim 1, wherein, taking a starting point of a rise in the set flow rate as a reference, the integral gain switching portion switches the integral gain set in the valve controller from the reference integral gain to the corrected integral gain after a predetermined time has elapsed.

7. The vaporization device according to claim 1, wherein a switching timing of the switch from the reference integral gain to the corrected integral gain is set during a period from a starting point of a rise in the flow rate response in a case in which the control valve is continuously controlled while being fixed to the reference integral gain until a peak point of the rise in the flow rate response.

8. The vaporization device according to claim 1, wherein the integral gain switching portion is formed in such a way that the switching timing of the switch from the reference integral gain to the corrected integral gain is set in accordance with a size of the set value showing the set flow rate or in accordance with the type of liquid material.

9. The vaporization device according to claim 1, further comprising a corrected integral gain modifying portion that modifies the corrected integral gain.

10. The vaporization device according to claim 9, wherein the corrected integral gain modifying portion modifies the corrected integral gain based on at least one of the type of liquid material, a set flow rate of the liquid material, a set pressure of the liquid material, a set flow rate of a carrier gas, a pressure on an upstream side from the control valve, a pressure on a downstream side from the control valve, a set temperature of the control valve, a set temperature of the vaporizing portion, and a peripheral temperature.

11. The vaporization device according to claim 1, wherein the control valve comprises:
a liquid intake port through which the liquid material is introduced into an interior of the vaporization device;
a gas intake port through which the carrier gas is introduced into the interior of the vaporization device; and
a discharge port through which a gas-liquid mixture that is formed by mixing together the liquid material and the carrier gas is discharged to an interior of the vaporization device.

12. The vaporization device according to claim 1, wherein the control valve and the vaporizing portion are provided adjacent to each other.

13. A control method for a vaporization device that includes a control valve that is provided on a flow path along which flows a liquid material, a vaporizing portion in which the liquid material is vaporized by decompression or heating, and a liquid flow rate sensor that measures a flow rate of a liquid material flowing along the flow path, in which
the control valve is controlled using PI control or PID control that is based on a set value showing a set flow rate and on a measurement value of the flow rate that is measured by the liquid flow rate sensor, and,
during a transient response period of the flow rate that is measured by the liquid flow rate sensor, an integral gain set in the valve controller is switched from a reference integral gain to a corrected integral gain that is different from the reference integral gain.

14. A non-transitory storage medium for a control program that is used in a vaporization device that includes a control valve that is provided on a flow path along which flows a liquid material, a vaporizing portion in which the liquid material is vaporized by decompression or heating, and a liquid flow rate sensor that measures a flow rate of a liquid material flowing along the flow path, and that is characterized in causing a computer to function as:
a valve controller that controls the control valve using PI control or PID control that is based on a set value showing a set flow rate and on a measurement value of the flow rate that is measured by the liquid flow rate sensor; and as
an integral gain switching portion that, during a transient response period of the flow rate that is measured by the liquid flow rate sensor, switches an integral gain set in the valve controller from a reference integral gain to a corrected integral gain that is different from the reference integral gain.

15. A fluid control device comprising:
a control valve that is provided on a flow path along which flows a fluid; and
a valve controller that controls the control valve using PI control or PID control that employs a set value of a flow rate or pressure indicated by a target command and a measurement value that is measured by a fluid sensor, wherein
the control valve is provided in a usage environment in which, during the control performed by the valve controller, a temperature change of a predetermined value or greater is generated subsequent to a rise of a measurement value that is measured by the fluid sensor, and wherein
the fluid control device further comprises an integral gain switching portion that, during a transient response period of the measurement value that is measured by the fluid sensor, switches on integral gain set in the valve controller from a reference integral gain to a corrected integral gain that is different from the reference integral gain.

* * * * *

UNITED STATES PATENT AND TRADEMARK OFFICE
CERTIFICATE OF CORRECTION

PATENT NO. : 12,399,513 B2  
APPLICATION NO. : 18/049762  
DATED : August 26, 2025  
INVENTOR(S) : Yada et al.

Page 1 of 1

It is certified that error appears in the above-identified patent and that said Letters Patent is hereby corrected as shown below:

In the Claims

Column 20, Line 61, delete "on integral gain" and insert --an integral gain--.

Signed and Sealed this  
Third Day of February, 2026

John A. Squires  
*Director of the United States Patent and Trademark Office*